United States Patent Office 3,524,470
Patented Aug. 18, 1970

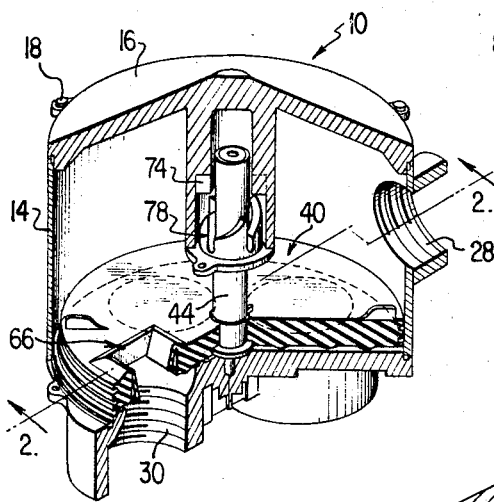
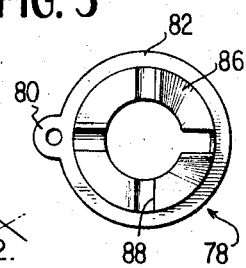
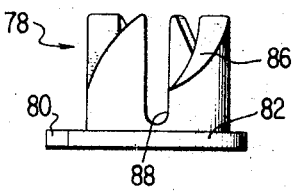
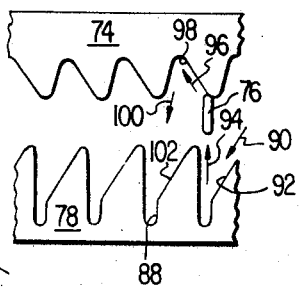
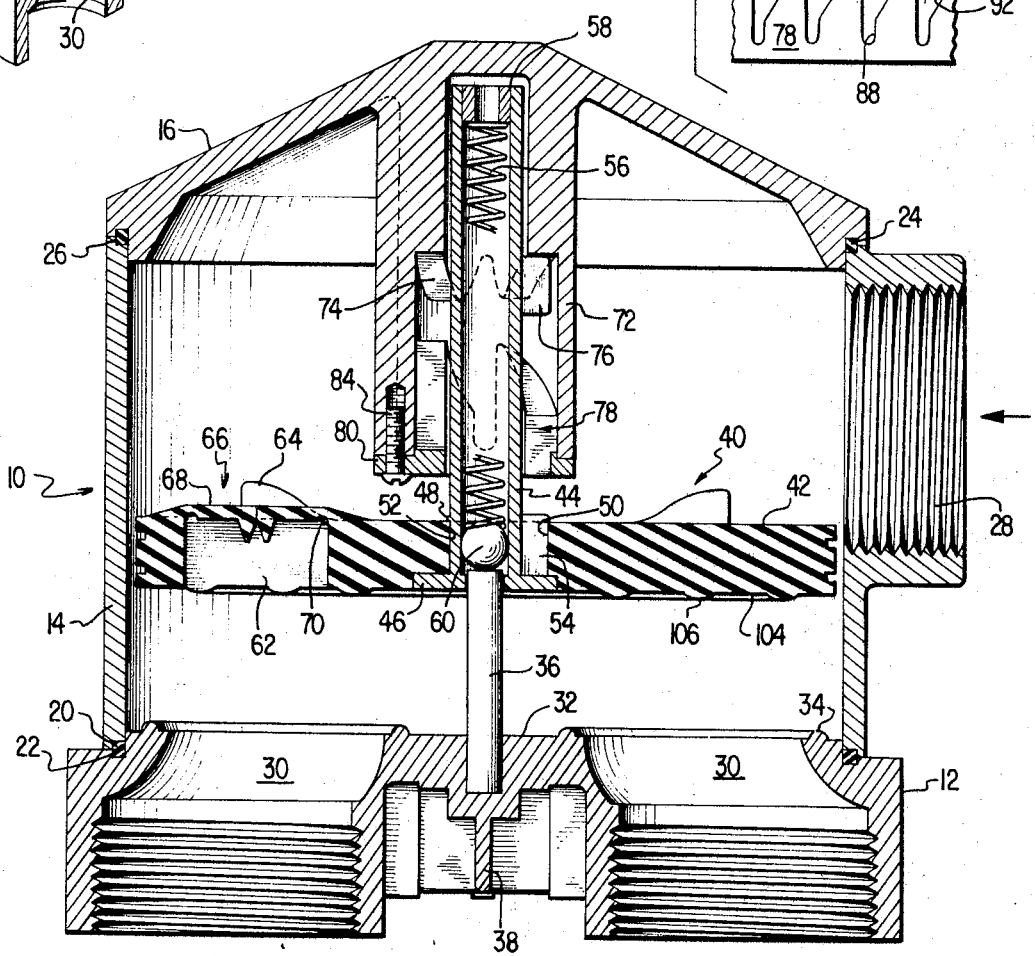

3,524,470
SEQUENCING VALVE
Carl L. C. Kah, Jr., Apt. 138, Garden Villas Apt., Plant Road, and Roger D. Slagel, 294 Balsam St., both of Palm Beach Gardens, Fla.
Continuation-in-part of application Ser. No. 562,653, July 5, 1966. This application Nov. 29, 1967, Ser. No. 686,664
Int. Cl. F16k 11/00, 31/12
U.S. Cl. 137—624.18
10 Claims

ABSTRACT OF THE DISCLOSURE

The disclosure is directed to a valve which distributes line pressure from a single inlet flow line, sequentially, through a plurality of outlet flow lines as a function of pulsating line pressure. The valve includes a housing having a valving member positioned between the inlet line and the outlet lines which undergoes reciprocable and step-by-step rotatable movement in response to changes in input line pressure. The valving member has a single opening therein which is sequentially aligned with a single one of the outlet lines and provides a seal for the remaining outlet lines. The opening in the valving member is provided with a pressure responsive valve, which may be a flap valve, that functions to increase the sensitivity of the valving member to reduced flow rates.

CROSS REFERENCE TO RELATED APPLICATION

This is a continuation-in-part application of application Ser. No. 562,653, now U.S. Pat. No. 3,460,560, filed July 5, 1966.

BACKGROUND OF THE INVENTION

The invention relates generally to valves of the type disclosed in U.S. Pats. 2,666,450; 2,833,309; and 3,124,162 and, more particularly, to that disclosed in copending application Ser. No. 562,653 filed July 5, 1966.

Sequencing valves of the type previously known have not been sufficiently sensitive to reduced flow rates while maintaining the other advantages disclosed in the copending application, above identified. Additionally, the method of sealing various ones of the outlet ports, as previously practiced, has involved the use of rubber O-rings or the like. The installation of such sealing means increases manufacturing costs and increases the parts inventory that must be maintained for service.

SUMMARY OF THE INVENTION

It is a primary object of the invention to provide a sequencing valve that is responsive to relatively low flow rates.

It is among the further objects of the invention to provide a sequencing valving member which coacts with various ones of the outlet ports to seal the same without the use of separable sealing elements; to provide a valving member having integrated therewith structure providing a valve member unseating function; to provide a valving member that can tolerate greater manufacturing tolerances without loss of efficiency; to reduce the cost of fabricating the valve member, per se; and to provide a sequencing valve housing that may be readily assembled and disassembled and whose component parts may be formed by casting.

The foregoing objects are achieved by forming a portion of the valving member from a flexible material, such as rubber, and providing integral flap valves to overlie the single opening therein which sequentially communicates the inlet line with various ones of the outlet lines. The use of a flexible valving member component makes possible the provision of more economical sealing capabilities as well as an improved disk unseating function and permits a relatively wide range of misalignment between the flexible component and its cooperating parts.

DESCRIPTION OF THE DRAWINGS

A more complete understanding of the invention will follow from the description of the accompanying drawings wherein:

FIG. 1 is a perspective view, partially in section, depicting an embodiment of the present invention with the valving member shown in its lower position under the influence of input line pressure;

FIG. 2 is a sectional elevation taken along line 2—2 of FIG. 1 but in which the valving member is shown in the upper position which it assumes under reduced input line pressure;

FIG. 3 is a top plan view of a lower cam member carried by the housing of FIGS. 1 and 2;

FIG. 4 is an elevation of the cam member of FIG. 3; and

FIG. 5 is a development depicting the relationship of the cam surfaces of the upper and lower cam members carried by the housing and the cam follower carried by the valving member.

DESCRIPTION OF THE PREFERRED EMBODIMENT

The housing 10 depicted in FIGS. 1 and 2 is composed of a lower section 12, an intermediate section 14 and an upper or closure section 16. The three sections are assembled by means of bolts 18 and maintained in sealed relationship by means of an O-ring 20 received in an annular groove 22 formed in the lower section 12 and an O-ring 24 received in an annular groove 26 formed in the upper section 16.

The intermediate section 14 of the housing contains an inlet port 28 provided with internal threads and disposed tangentially with respect to the housing so as to impart the proper direction of flow to the incoming liquid. The lower section 12 of the housing contains a desired number of internally threaded axially disposed outlet ports 30, four of which have been depicted for the purposes of example in the accompanying drawing. The upper surface 32 of lower section 12 is formed with raised integral metal rings 34 surrounding the upstream end of each outlet port and projecting above the surface 32 for sealing engagement with a valving member. Also projecting from the upper surface 32 of the housing lower section 12 is a guide rod 36 whose lower end can be staked into the lower section 12 or otherwise suitably secured thereto. The outer wall of the lower section 12, centrally of the outlet ports, may be provided with suitable reinforcing webs 38.

A valving member 40 is depicted as comprising a ported rubber disk 42 and a tubular shaft 44 extending axially and centrally therefrom and frictionally secured thereto. Disk 42 is frictionally held adjacent the lower end of shaft 44 between collar 46 and annular ridge 48 formed integral with the shaft. Slot 50, intersecting the central disk opening 52, coacts with key 54 provided on shaft 44 to secure the parts against relative rotation. One end of a coiled spring 56 bears against an abutment secured to the upper end 58 of the tubular shaft and the other end of the spring bears against a ball 60 which is maintained in engagement with the end of the guide rod 36, whereby the valving member 40 will be biased by the spring 56 in a direction away from the outlet ports 30.

The ported disk 42 contains a port 62 which is sequentially registered with the outlet ports 30, while the disk is maintained in sealing engagement with metal rings 34, in a manner to be described. A slight clearance is provided between the outer circumference of disk 42 and intermediate housing section 14 to eliminate sensitivity to dirt and permit greater manufacturing tolerances. Disk 42 may be provided with an upwardly directed peripheral flange (not shown) if desired to permit even greater tolerances between the valving member and housing as more fully discussed in the aforementioned copending application. The upper surface of the ported disk carries a plurality of radially disposed vanes or ribs 64, so as to lie in the flow path of liquid introduced through the inlet port 28, to produce a tendency for the valving member to rotate under the influence of tangential flow. The circumferential surface of the disk may, if desired, be provided with a plurality of circumferential grooves for the purpose of creating a labyrinth type seal between the disk and housing. A factor of great importance in increasing the permissible range of manufacturing tolerances is the use of flexible disk 40 whereby the same may partake of limited movement relative to shaft 44 in order to effect tight sealing engagement with the outlet ports even though the lower surface of collar 46 may not be precisely parallel with surface 32 in the position of FIG. 1.

Port 62 is provided with a pressure responsive valve means 66 consisting of a pair of flap valve elements 68 formed integrally with flexible rubber disk 42. The cross-sectional areas of the flaps are reduced adjacent their line of attachment to the disk to define integral hinges 70 permitting downward movement of the flap elements from the closed position shown in FIG. 2 to the open position of FIG. 1.

The inherent resiliency of integral hinges 70 maintains flap valves 68 in the closed position of FIG. 2 in the absence of a predetermined pressure differential across disk 42. The pressure differential necessary to open flap valves 68 may be selected over a wide range of flow rates merely by varying the cross-sectional hinge configuration. It is, however, important to note that the pressure differential necessary to open the flap valves must exceed that required to overcome the bias of spring 56 urging valve member 40 to the upper position of FIG. 2 for reasons that will be made more apparent in the ensuing description.

The tubular shaft 44 is slidably and rotatably received in a tubular sleeve 72 depending from the upper or closure section 16 of the housing. An upper cam member 74 is formed integral with the sleeve for cooperation with a follower 76 carried by the tubular shaft 44. A lower cam member 78 is received in the lower open end of the tubular sleeve 72 and by means of a lobe 80 formed on the peripheral flange 82 of the lower cam member, a screw 84, extending through an opening in the lobe, secures the lower cam member to the tubular sleeve 72, so that this cam member also cooperates with the follower 76 carried by the tubular sleeve 72.

As shown in FIGS. 3 and 4, the lower cam member 78 carries four cam surfaces 86, spaced by slots 88, since there are four outlet ports 30. It will be understood that any desired number of outlet ports can be provided, and accommodated by selecting cams having a corresponding number of cam surfaces. Additionally, lower cam member 78 could be provided with a lesser number of cam surfaces, such as two for example, with a lesser slope than that illustrated wherein each of the two cam surfaces would extend substantially 180° circumferentially of the cam member. Such a construction would permit one to convert from a four outlet to a two outlet sequencing valve merely by substituting a different lower cam member to cooperate with the same follower and upper cam illustrated in the drawing.

As will be apparent from an inspection of the somewhat diagrammatic development of the upper and lower cams depicted in FIG. 5, application of line pressure to the inlet port 28 will impart a downward movement to the valving member and a rotational movement by virtue of the reaction of the tangential flow on the vanes or ribs 64, and the follower 76 will receive a movement in the direction of the arrow 90 along the surface 92 of the lower cam member 78.

Upon admission of a predetermined line pressure to inlet port 28 the cam element or follower 76 will be in the lowermost position in the slot 88 below the surface 92, the valving member 40 will engage the metal rings 34 surrounding the outlet ports with the port 62 being aligned with only one of the outlet ports through which the fluid flow will occur. As the flow rate increases to produce a pressure differential across disk 40 in excess of that required to move the valving member to the lower position of FIG. 1 the flap valves 68 will open. This condition will prevail so long as the line pressure is maintained. When the line pressure is sufficiently reduced or entirely removed, the flap valves will close and the force of spring 56 will elevate the valving member 40, permitting the cam element or follower 76 to move in the direction of the arrow 94 and the arrow 96 along cam surface 98 of the upper cam 74, imparting rotation to the valving member so that its port 62 will be in readiness for alignment with the next of the outlet ports 30 in the desired sequence. Renewed application of line pressure will cause the valving member to be moved downwardly and the cam follower 76 to follow the path indicated by the arrow 100 for engagement with the surface 102 of the lower cam 78 whereby further rotation of the valving member will occur until its port 62 is actually in registry with the next outlet port to be served after which time flap valves 68 will open. This mode of operation will be repeated each time line pressure is applied and removed.

It will be readily apparent that the presence of flap valves 68 greatly increase the sensitivity of the sequencing valve to reduced flow rates. Because of the fact that the flap valves require an opening pressure differential in excess of that necessary to index and depress valving member 40, the total flow entering port 28, except for the relatively small leakage about the circumference of the disk 42, is initially converted into a differential pressure drop across the disk. This condition maintains until the disk is lowered to the position of FIG. 1 and the presure drop attains a value sufficient to open the flap valves. The flaps are so sized that substantially all of the flow is through valve port 62 with virtually no leakage around the circumference of disk 42. Additionally, the cross-sectional configuration of hinges 70 is selected to insure that the flaps are bent full open even at the minimum flow rate necessary to sequence the valve which prevents the same from fluctuating under flow conditions and undergoing rubber fatigue over long term usage.

It will be evident that the positioning of the cam members 74 and 78, and the spring 56, so as to be protected from the direct flow of liquid, will reduce the likelihood of the intrusion of foreign matter to these components, and assure better operation with reduced need for service and maintenance. In addition, the tangential flow from the inlet port 28 would tend to prevent the accumulation of foreign material within the housing itself.

The lower or downstream surface 104 of the rubber valving member is provided with integral annular projecting ridges 106 for engagement with the metal rings 34 surrounding the outlet ports. The projecting ridges 106, in the lowermost position of the valving member 40, will intersect the metal rings 34 and be depressed thereby to a greater degree than the remaining portions of the lower surface 104 which are engaged directly by the upper surface 32 of lower housing section 12 where the projections do not exist. This additional deformation of the rubber ridges provides an added separation force, due to the resiliency of the same, to initiate upward movement of the valving member from the outlet ports when line pressure is reduced.

It will be understood that the total force to move the valving member toward the outlet ports is produced by the flow of liquid from a point upstream of the valving member to a point downstream thereof.

A sequencing valve embodying the present invention is very quiet and smooth working and is admirably suited for the sequential sprinkling of areas to which water is to be applied. Such devices are extremely useful in the maintenance of golf courses, general irrigation, and other applications.

Whereas only one specific embodiment of the invention has been described with reference to the accompanying drawings, variations will be suggested to those skilled in the art within the scope of the appended claims.

We claim:

1. A sequencing valve automatically responsive to the application and reduction of line pressure, comprising; a housing having an inlet port and a plurality of outlet ports, a valving member in said housing containing at least one port, said valving member being rotatable and reciprocable in response to a pressure differential across said valving member created by fluid flow upon the application of line pressure for selectively closing at least one of said outlet ports, valving means for opening and closing said one port in response to application and reduction of line pressure, and means mounting said valving means on said valving member for opening movement in the direction of the reduced pressure side of said pressure differential created across said valving member whereby said valving means may be opened solely by the pressure differential applied thereacross, first biasing means said valving means in opposition to said opening movement, first cam means carried by said valving member, second cam means carried by said housing engageable with said first cam means for indexing said valving member, second means biasing said valving member away from said outlet ports, and said second biasing means being responsive to a lesser differential pressure across said valving member than said first biasing means whereby said pressure differential will be applied across a greater area of said valving member for increasing the sensitivity of the same to reduced flow rates.

2. A sequencing valve according to claim 1 wherein said inlet port is tangentially disposed with respect to said valving member.

3. A sequencing valve according to claim 1 wherein said valving member includes a resilient disk having an upstream surface proximate to said inlet port and a downstream surface proximate to said outlet ports.

4. A sequencing valve according to claim 1 wherein said biasing means is carried by said valving member.

5. A sequencing valve according to claim 1 wherein said first biasing means has a force less than that imposed by line pressure upon the closed area of the valving member.

6. A sequencing valve automatically responsive to the application and reduction of line pressure, comprising; a housing having an inlet port and a plurality of outlet ports, a valving member in said housing containing at least one port, means carried by said valving member for opening and closing said one port in response to application and reduction of line pressure, said valving member being rotatable and reciprocable in response to a pressure differential across said valving member created by fluid flow upon the application of line pressure for selectively closing at least one of said outlet ports, first cam means carried by said valving member, second cam means carried by said housing engageable with said first cam means for indexing said valving member, means biasing said valving member away from said outlet ports, said valving member including a resilient disc having an upstream surface proximate to said inlet port and a downstream surface proximate to said outlet ports, and rigid sealing elements surrounding said outlet ports and projecting therefrom toward said valving member.

7. A sequencing valve according to claim 6 wherein said downstream surface carries resilient projecting ridge means engageable with said rigid sealing elements.

8. A sequencing valve automatically responsive to the application and reduction of line pressure, comprising; a housing having an inlet port and a plurality of outlet ports, a valving member in said housing containing at least one port, means carried by said valving member for opening and closing said one port in response to application and reduction of line pressure, said valving member being rotatable and reciprocable in response to a pressure differential across said valving member created by fluid flow upon the application of line pressure for selectively closing at least one of said outlet ports, first cam means carried by said valving member, second cam means carried by said housing engageable with said first cam means for indexing said valving member, means biasing said valving member away from said outlet ports, and said valving member including vane means in the path of fluid introduced through said inlet port.

9. A sequencing valve automatically responsive to the application and reduction of line pressure, comprising; a housing having an inlet port and a plurality of outlet ports, a valving member in said housing containing at least one port, means carried by said valving member for opening and closing said one port in response to application and reduction of line pressure, said valving member being rotatable and reciprocable in response to a pressure differential across said valving member created by fluid flow upon the application of line pressure for selectively closing at least one of said outlet ports, first cam means carried by said valving member, second cam means carried by said housing engageable with said first cam means for indexing said valving member, means biasing said valving member away from said outlet ports, and said first named means consisting of a pair of flap valves formed integrally with said valving member and having integral hinge means biasing said flap valves to a position closing said one port.

10. A sequencing valve according to claim 9 wherein the pressure differential necessary to overcome the biasing force of said hinge means exceeds that required to overcome the bias of said valving member away from the outlet ports.

References Cited

UNITED STATES PATENTS

| | | | |
|---|---|---|---|
| 2,666,450 | 1/1954 | Berry | 137—614.17 |
| 3,116,757 | 1/1964 | Donguy | 137—625.11 |
| 3,369,565 | 2/1968 | Haggard | 137—624.18 XR |

WILLIAM F. O'DEA, Primary Examiner

W. H. WRIGHT, Assistant Examiner

U.S. Cl. X.R.

137—625.11, 625, 119

UNITED STATES PATENT OFFICE
CERTIFICATE OF CORRECTION

Patent No. 3,524,470      Dated August 18, 1970

Inventor(s) Carl L. C. Kah, Jr., et al

It is certified that error appears in the above-identified patent and that said Letters Patent are hereby corrected as shown below:

Col. 5, line 32: Change "means said valving" to -- means biasing said valving -- .

SIGNED AND
SEALED
OCT 20 1970

(SEAL)
Attest:

Edward M. Fletcher, Jr.
Attesting Officer

WILLIAM E. SCHUYLER, JR.
Commissioner of Patents